United States Patent
Tanami

(10) Patent No.: US 12,287,880 B2
(45) Date of Patent: Apr. 29, 2025

(54) AUTOMATIC ROOT KEY AND CERTIFICATE UPDATE DURING FIRMWARE UPDATE PROCEDURE

(71) Applicant: NUVOTON TECHNOLOGY CORPORATION, Hsin-chu (TW)

(72) Inventor: Oren Tanami, Ra'anana (IL)

(73) Assignee: Nuvoton Technology Corp., Hsinchu (TW)

(*) Notice: Subject to any disclaimer, the term of this patent is extended or adjusted under 35 U.S.C. 154(b) by 242 days.

(21) Appl. No.: 17/903,064

(22) Filed: Sep. 6, 2022

(65) Prior Publication Data
US 2024/0080206 A1    Mar. 7, 2024

(51) Int. Cl.
| | |
|---|---|
| *G06F 21/57* | (2013.01) |
| *G06F 8/65* | (2018.01) |
| *H04L 9/06* | (2006.01) |
| *H04L 9/08* | (2006.01) |
| *H04L 9/32* | (2006.01) |

(52) U.S. Cl.
CPC ........... *G06F 21/572* (2013.01); *G06F 8/65* (2013.01); *H04L 9/0631* (2013.01); *H04L 9/0891* (2013.01); *H04L 9/3268* (2013.01)

(58) Field of Classification Search
CPC .................................................. G06F 21/572
See application file for complete search history.

(56) References Cited

U.S. PATENT DOCUMENTS

| | | | |
|---|---|---|---|
| 8,560,823 B1* | 10/2013 | Aytek ............... | G06F 8/654 713/2 |
| 9,325,708 B2 | 4/2016 | Koyun et al. | |
| 9,503,431 B2 | 11/2016 | Chen et al. | |
| 10,009,179 B2 | 6/2018 | Acar et al. | |
| 11,416,639 B2 | 8/2022 | Tanami et al. | |

(Continued)

FOREIGN PATENT DOCUMENTS

| | | |
|---|---|---|
| EP | 1967979 A2 | 9/2008 |
| WO | 2009070339 A1 | 6/2009 |

OTHER PUBLICATIONS

Arthur et al., "A Practical Guide to TPM 2.0—Using the Trusted Platform Module in the New Age of Security," ApressOpen, Apress Media, LLC, pp. 1-375, year 2015.

(Continued)

*Primary Examiner* — Bradley W Holder
(74) *Attorney, Agent, or Firm* — Meitar Patents Ltd.; Daniel Kligler

(57) ABSTRACT

A security device includes a memory and a processor. The memory is configured to store security firmware (FW), an active cryptographic key and an inactive cryptographic key. The active cryptographic key is associated with an active authentication certificate for authenticating the active cryptographic key, and the inactive cryptographic key is associated with an inactive authentication certificate for authenticating the inactive cryptographic key. The processor is configured to carry out security tasks by executing the security FW, and, provided a security-update indication is received, to (i) inactivate the active cryptographic key and the active authentication certificate, and (ii) activate the inactive cryptographic key and the inactive authentication certificate.

16 Claims, 4 Drawing Sheets

(56) References Cited

U.S. PATENT DOCUMENTS

| | | | |
|---|---|---|---|
| 2005/0021968 A1* | 1/2005 | Zimmer | G06F 21/572 |
| | | | 713/176 |
| 2005/0138374 A1 | 6/2005 | Zheng et al. | |
| 2009/0119785 A1 | 5/2009 | Challener et al. | |
| 2012/0151199 A1* | 6/2012 | Shriver | G06F 21/575 |
| | | | 713/193 |

OTHER PUBLICATIONS

"Trusted Platform Module (TPM)—Summary," version 04292008, White Paper by Trusted Computing Group (TCG), pp. 1-3, Apr. 29, 2008, as downloaded from https://trustedcomputinggroup.org/resource/trusted-platform-module-tpm-summary/.

* cited by examiner

AUTOMATIC ROOT KEY AND CERTIFICATE UPDATE DURING FIRMWARE UPDATE PROCEDURE

FIELD OF THE INVENTION

The present invention relates generally to Security Devices, and particularly to methods and systems for restoring the security of compromised Trusted platform Modules (TPMs) and other Security Devices.

BACKGROUND OF THE INVENTION

Computer systems typically use a Trusted Platform Module (TPM) to increase the security level of sensitive operations.

A summary of TPM definition and functionality is described in "Trusted Platform Module (TPM) Summary", version 04292008 (Apr. 29, 2008)—a white paper by Trusted Computing Group (TCC). A TPM, according to the paper, is a computer chip (microcontroller) that can securely store artifacts used to authenticate the platform (PC or laptop). These artifacts can include passwords, certificates, or encryption keys. A TPM can also be used to store platform measurements that help ensure that the platform remains trustworthy. Authentication (ensuring that the platform can prove that it is what it claims to be) and attestation (a process helping to prove that a platform is trustworthy and has not been breached) are necessary steps to ensure safer computing in all environments.

Chapter 3 of the book "a Practical Guide to TPM 2.0", Arthur and Challener presents a high-level tutorial on TPM 2.0 and the design rationale behind it. It begins with applications and use cases enabled by TPM 1.2, all of which are also available in TPM 2.0, and then continues by describing the new capabilities that are available with the TPM 2.0 specification.

U.S. Pat. No. 10,009,179 discloses example apparatus and methods for a more secure a device for electronic commerce. An example device includes a trusted platform module (TPM) that stores a public key and a private key. The device is provisioned with account information, user information, and device information. The TPM uses the account, user, and device information to acquire attestation credentials and endorsement credentials. The device uses the account, user and device information along with the attestation credentials and endorsement credentials to acquire limited use keys (LUKs) that are encrypted with the public key. The LUKs will only be decrypted as needed to support an actual transaction at the time of the transaction.

SUMMARY OF THE INVENTION

An embodiment of the present invention that is described herein provides a security device including a memory and a processor. The memory is configured to store security firmware (FW), an active cryptographic key and an inactive cryptographic key. The active cryptographic key is associated with an active authentication certificate for authenticating the active cryptographic key, and the inactive cryptographic key is associated with an inactive authentication certificate for authenticating the inactive cryptographic key. The processor is configured to carry out security tasks by executing the security FW, and, provided a security-update indication is received, to (i) inactivate the active cryptographic key and the active authentication certificate, and (ii) activate the inactive cryptographic key and the inactive authentication certificate.

In some embodiments, the inactive cryptographic key is encrypted, and the processor is configured to receive a decryption key and to decrypt the inactive cryptographic key using the decryption key. In an embodiment, the processor is further configured to authenticate the decrypted inactive cryptographic key. In an example embodiment, the inactive cryptographic key is encrypted using Advanced Encryption Standard (AES) encryption.

In some embodiments, the inactive cryptographic key includes a Rivest-Shamir-Adleman (RSA) key. In other embodiments, the inactive cryptographic key includes an Elliptic-Curve-Cryptography (ECC) key.

There is additionally provided, in accordance with an embodiment that is described herein, a method for firmware updating in a secure device. The method includes storing in the secure device security firmware (FW), an active cryptographic key and an inactive cryptographic key. The active cryptographic key is associated with an active authentication certificate for authenticating the active cryptographic key, and the inactive cryptographic key is associated with an inactive authentication certificate for authenticating the inactive cryptographic key. Security tasks are carried out by executing the security FW. Provided that a security-update indication is received, the active cryptographic key and the active authentication certificate are inactivated, and the inactive cryptographic key and the inactive authentication certificate are activated.

The present invention will be more fully understood from the following detailed description of the embodiments thereof, taken together with the drawings in which:

DETAILED DESCRIPTION OF EMBODIMENTS

Overview

Figure 1:
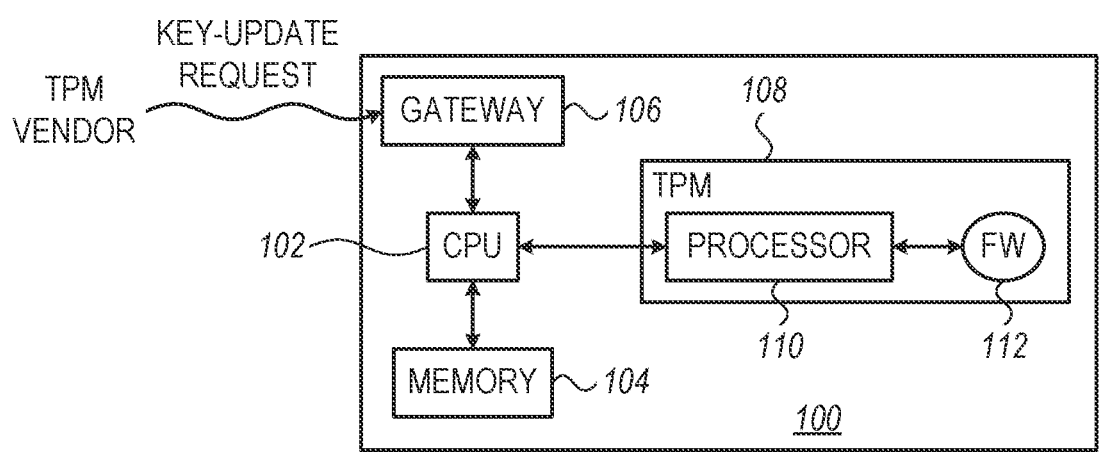
FIG. 1 is a block diagram that schematically illustrates a computer with a security device that allows secure key update, in accordance with an embodiment of the present invention.

Security devices such as Trusted Platform Modules (TPMs) are typically installed in a computer such as a personal computer (PC), an enterprise computer, or other, and provide the computer's Central Processing Unit (CPU) with a secure operation means.

The security device typically comprises a firmware (FW), one or more cryptographic keys and, for each cryptographic key, an authentication certificate. The firmware and the keys are stored in non-volatile memory. A TPM vendor may provide the TPM with preprogrammed FW and with keys and certificates that are supplied by a certification authority. (A TPM is regarded herein as one example type of secure device. The embodiments described herein refer mainly to TPMs, by way of example, but the disclosed techniques can be used with other suitable types of secure devices. We will refer below to TPMs and security devices interchangeably.)

The term "TPM Vendor" will apply below to any entity that provides TPM updates—including the actual vendor and also including integrators such as computer vendors that embed the TPM in a product, trusted computer providers, and the like. We will refer below to the entity that installs TPM updates (e.g., vendors of personal or of enterprise computers) as the "TPM user".

The TPM vendor may send FW updates from time to time, e.g., to fix bugs. The TPM user authenticates the updated FW, and, if the authentication is successful, may load the updated FW into the TPM.

The TPM vendor may send a FW update also in case a security breach in the FW is detected; however, in this case, some installed TPMs may have already been breached, and one or more cryptographic keys may have already been hacked. Sending a corrected FW, therefore, may leave some TPM installations vulnerable.

Embodiments according to the present invention provide for methods and systems that allow secure FW and keys update in case a security breach is detected. In some embodiments, the TPM includes, in addition to the active security keys, one or more inactive security keys and the corresponding certificates; if a security breach is detected, the TPM may inactivate the previous, possibly compromised keys, and activate the inactive keys. In some embodiments the inactive keys are encrypted.

SYSTEM DESCRIPTION

A TPM typically comprises one or more cryptographic keys; different keys are provisioned for each TPM instance, and no two TPMs get the same key (or, at least, the probability that any two TPMs will have the same key is infinitesimally small). In embodiments, in case of a security breach, the active keys can be securely changed in the field.

In some embodiments, the TPM comprises, in addition to the active cryptographic keys and the corresponding certificates, at least one additional inactive key or set of keys, with corresponding certificates (in some embodiments the certificates may be stored in a memory which is not part of the TPM; in an embodiment the certificate may be accessed through a communication network). In an embodiment, some (or all) inactive keys may be encrypted.

When a FW update that includes update of the keys is initiated, e.g., by the TPM vendor, the TPM receives the new FW, with an instruction to activate one or more inactive keys and corresponding certificates, and to mark the previously used key or keys as inactive. In an embodiment, the previous key (or keys) may be deleted.

In some embodiments, the inactive key is encrypted, and the TPM receives a decryption key to decrypt the inactive key.

In some embodiments, the update indication is regarded by the TPM only as a permission to activate an inactive key and corresponding certificate. The actual activation is triggered later by some other trigger.

In embodiments, FW updates and/or key updates may be initiated by the TPM vendor or by other entities, such as the vendor of the computer in which the TPM is installed, an IT manager in large organizations, etc. We will refer hereinbelow to all such entities, in short, as the TPM vendors and, to the entity that uses the TPM, as TPM Owner.

It should be noted that, since each TPM comprises unique keys that cannot be altered, alternate keys cannot be injected into the FW as part of the FW update.

FIG. 1 is a block diagram that schematically illustrates a computer 100 with a security device that allows secure key update, in accordance with an embodiment of the present invention. Computer 100 comprises a Central Processing Unit (CPU) 102 for executing instructions, a memory 104 to store code and data, and an internet gateway (e.g., a Network Interface Card, NIC) 106, to communicate over a communication network.

To allow secure operations, computer 100 further comprises a Trusted Platform Module (TPM) 108, which comprises a processor 110, security firmware (FW) 112, and one or more security keys and security certificates (seen in FIG. 2 below). The CPU accesses the TPM using TPM commands (which include, for example, system status inquiry, attestation and others) to sign and to authenticate secure documents, to encrypt and decrypt documents, and to perform other security tasks.

The TPM vendor may send FW updates when needed. CPU 100 receives the updates through the network and sends the update to the TPM. The TPM authenticates the update, and then uses the updated FW instead of the previous FW.

According to the example embodiment illustrated in FIG. 1, the TPM vendor may initiate keys update (with or without FW update); the TPM includes pre-provisioned inactive keys and, upon receipt of a key-update notification from the TPM vendor, inactivates the current keys and activates the inactive keys, thus, securely changing the keys.

The configuration of computer 100, illustrated in FIG. 1 is cited by way of example. Other configurations may be used in alternative embodiments. For example, in some embodiments, computer 100 may comprise a plurality of CPUs of the same or of various types. In some embodiments, some of the TPM functions are executed by the CPU. In embodiments, there is no network gateway, and updates are installed, for example, using a flash drive.

Figure 2:
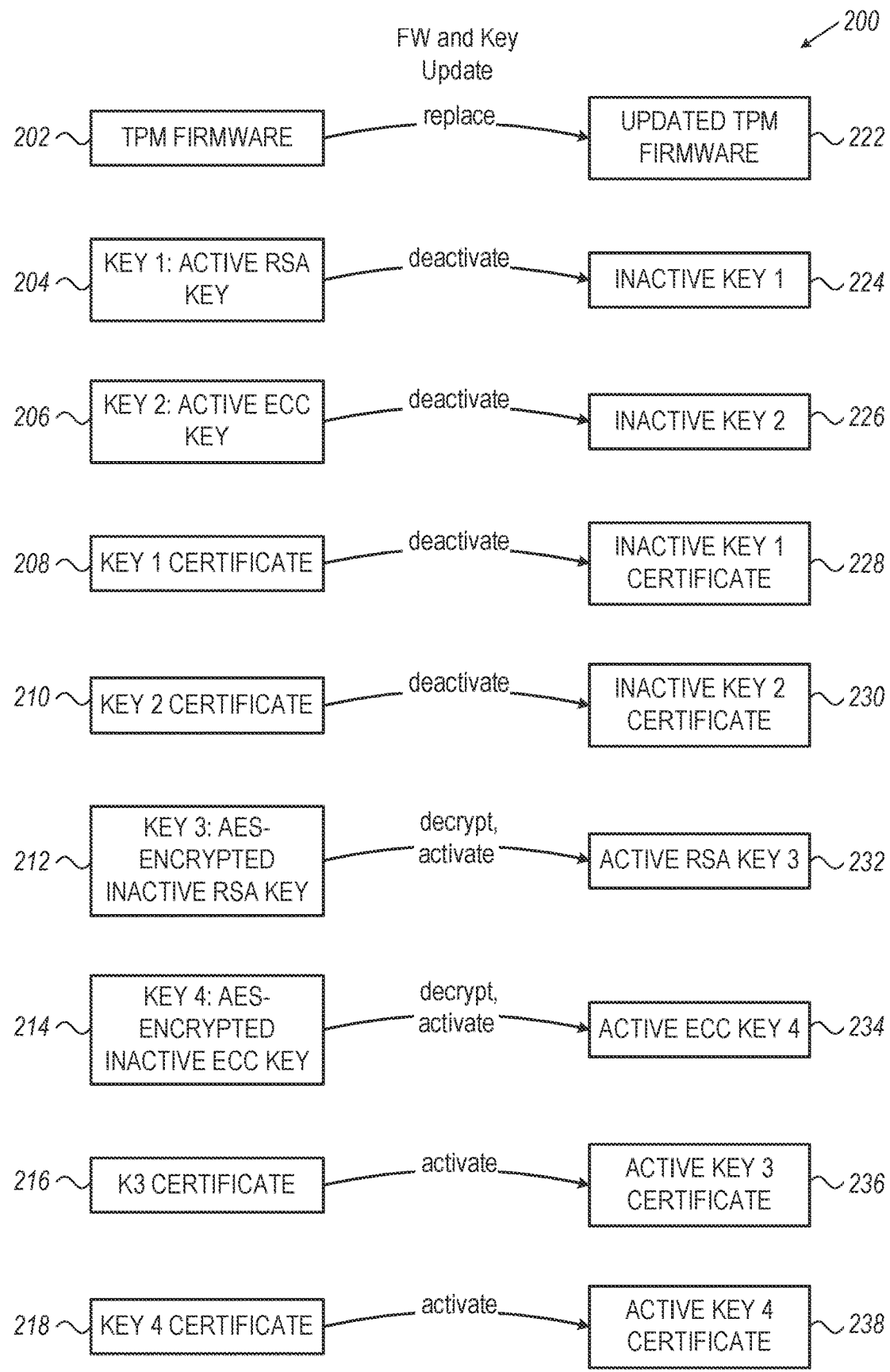
FIG. 2 is a block diagram that schematically illustrates a TPM facilitating secure key update, in accordance with an embodiment of the present invention.

FIG. 2 is a block diagram that schematically illustrates a TPM 200 facilitating secure key update, in accordance with an embodiment of the present invention. The TPM comprises a security Firmware (FW) 202 (similar to FW 112 of FIG. 1), which stores non-volatile code and data of the TPM; an active RSA key-1 204 and an active ECC key-2 206, which may be used for security tasks such as encryption, decryption and authentication; and, a key-1 security certificate 208 and a key-2 security certificate 210, for the authenticating of key-1 and key-2.

To allow field updating of TPM keys, TPM 200 further comprises an inactive RSA key-3 212, an inactive ECC key-4 214, a key-3 security certificate 216, and a key-4 security certificate 218 (TPM 200 uses the active key and certificate only).

According to the example embodiment illustrated in FIG. 2, inactive RSA key-3 212 and inactive ECC key-4 214 are encrypted, using Advanced Encryption Standard (AES). In other embodiments, other encryption algorithm may be used for some or all the inactive keys; in an embodiment, some or all the inactive keys are not encrypted.

The TPM vendor may issue FW updates from time to time, e.g., to correct bugs or improve performance. Typical FW updates may not include key updates (which may typically be used to authenticate the FW update). However, if a security breach is detected, the active key (or keys) may have been compromised. In embodiments, the TPM vendor may, in this case, initiate a key update, wherein an inactive key is activated, and the active key is scrapped. In the example embodiment illustrated in FIG. 2, the TPM vendor initiates a complete update, including FW and keys, and provides a new FW and decryption keys to decrypt the inactive keys.

As indicated by the arrows in FIG. 2, to update the FW and the keys, processor 110 of the TPM: (i) replaces FW 202 with a new version; (ii) deactivates active Key-1 204 and key-2 206 (for example, the inactive keys may be the original keys, written-over by all-1 bits); (iii) deactivates certificates 208, 210; (iv) decrypts (using an AES key that is provided with the update) and activates inactive keys k-3 212 and k-4 214; and, (v) activates certificates 216, 218. The software code for performing these operations is typically stored in the FW of the TPM.

As illustrated in FIG. 2, after the security update TPM 200 comprises: (i) and updated FW 222 (the FW version supplied with the update); (ii) an inactive key-1 224 and an inactive key-2 226 (for example, the scrapped key-1 204 and key-2 206); (iii) an inactive key-1 certificate 228 and an inactive certificate 230 (e.g., certificates 208 and 210, indicated as invalid); (iv) an active RSA key-3 232 and an active ECC key-4 234; and, (v) active key-3 and key-4 certificates 236, 238.

Thus, in embodiments, the TPM can be securely updated, including deactivating the previous keys and activating a new set of keys, which have been pre-provisioned.

The configuration of TPM 200 illustrated in FIG. 2 and described hereinabove is an example configuration that is cited by way of example. Other configurations may be used in alternative embodiments. For example, in an embodiment, only one active key is used and, hence, only one inactive key is pre-provisioned. In another embodiment, more than two keys are used, and more than two inactive keys are pre-provisioned. In yet another embodiment, more than one set of inactive keys is pre-provisioned.

Figure 3:
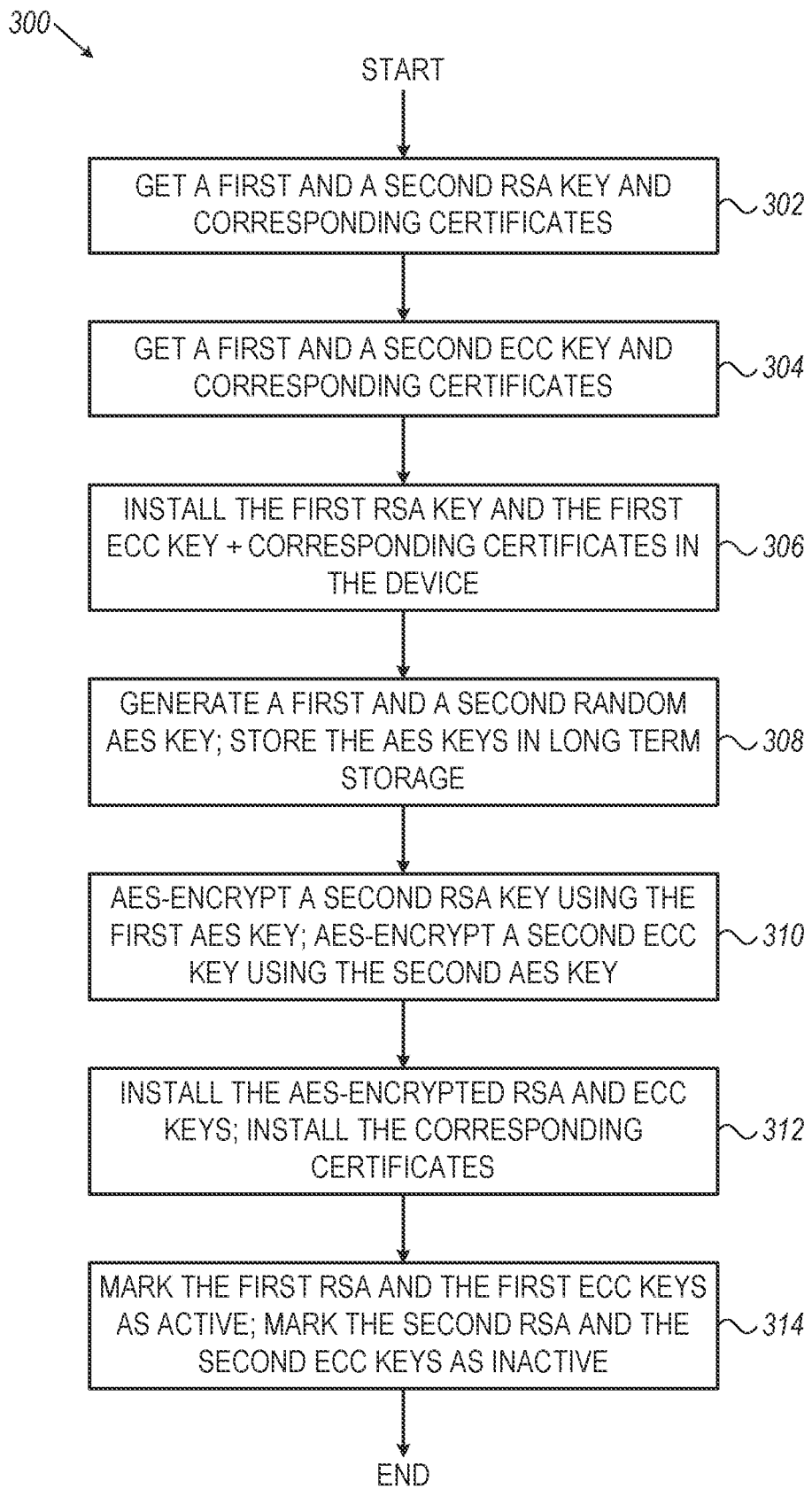
FIG. 3 is a flowchart that schematically illustrates a method for programming a TPM with secure key update, in accordance with an embodiment of the present invention.

FIG. 3 is a flowchart 300 that schematically illustrates a method for programming a TPM with secure key update, in accordance with an embodiment of the present invention. The flowchart is executed during TPM production, for example, by an Automatic Test Equipment (ATE).

The flowchart starts at a Get-RSA keys operation 302, wherein the ATE gets two RSA keys and corresponding certificates from a secure storage of keys. In embodiments, this operation is done using a Hardware Security Module (HSM), which generates and signs each key provisioned to the TPM. Next, at a Get-ECC keys operation 304, the ATE gets two ECC keys and corresponding certificates. Both the RSA and ECC keys and corresponding certificates are typically provided by a certification authority.

The ATE next, at an Install first Keys operation 306, programs a first RSA key and a first ECC key, with the corresponding certificates, in the TPM. The first keys and certificates will be used as active keys by the TPM.

In embodiments, a second set of keys will be AES-encrypted and installed, to be used in case one or both first keys are compromised. The ATE next, at a Select AES Keys operation 308, generates two random AES encryption keys. The ATE stores the selected random keys in a long-term storage.

If, further to a security breach that deems one or both first keys compromised, the TPM vendor initiates a key update, the TPM vendor will send the AES decryption keys to the TPM user (AES encryption and decryption keys are identical).

Next, at an AES-Encrypt operation 310, the ATE will encrypt a second RSA key and a second ECC key (from the keys selected in operation 304), and will, at an Install Encrypted Keys operation 312, install the encrypted RSA and ECC keys and the corresponding certificates in the TPM. Lastly, at a Mark-Active-Inactive operation 314, the ATE marks the first set of keys as active and the second set as inactive. In some embodiments, the marking comprises programming a bit in the FW.

The flowchart illustrated in FIG. 3 and described hereinabove is cited by way of example. Other flowchart configurations may be used in alternative embodiments. For example, in some embodiments other suitable cryptographic algorithms may be used. In an embodiment, the ATE installs more than one set of inactive keys in the TPM, to allow additional key update sessions. In some embodiments, authentication operations may be added. In various embodiments, the order of the operations depicted in flowchart 300 may be different.

Figure 4:
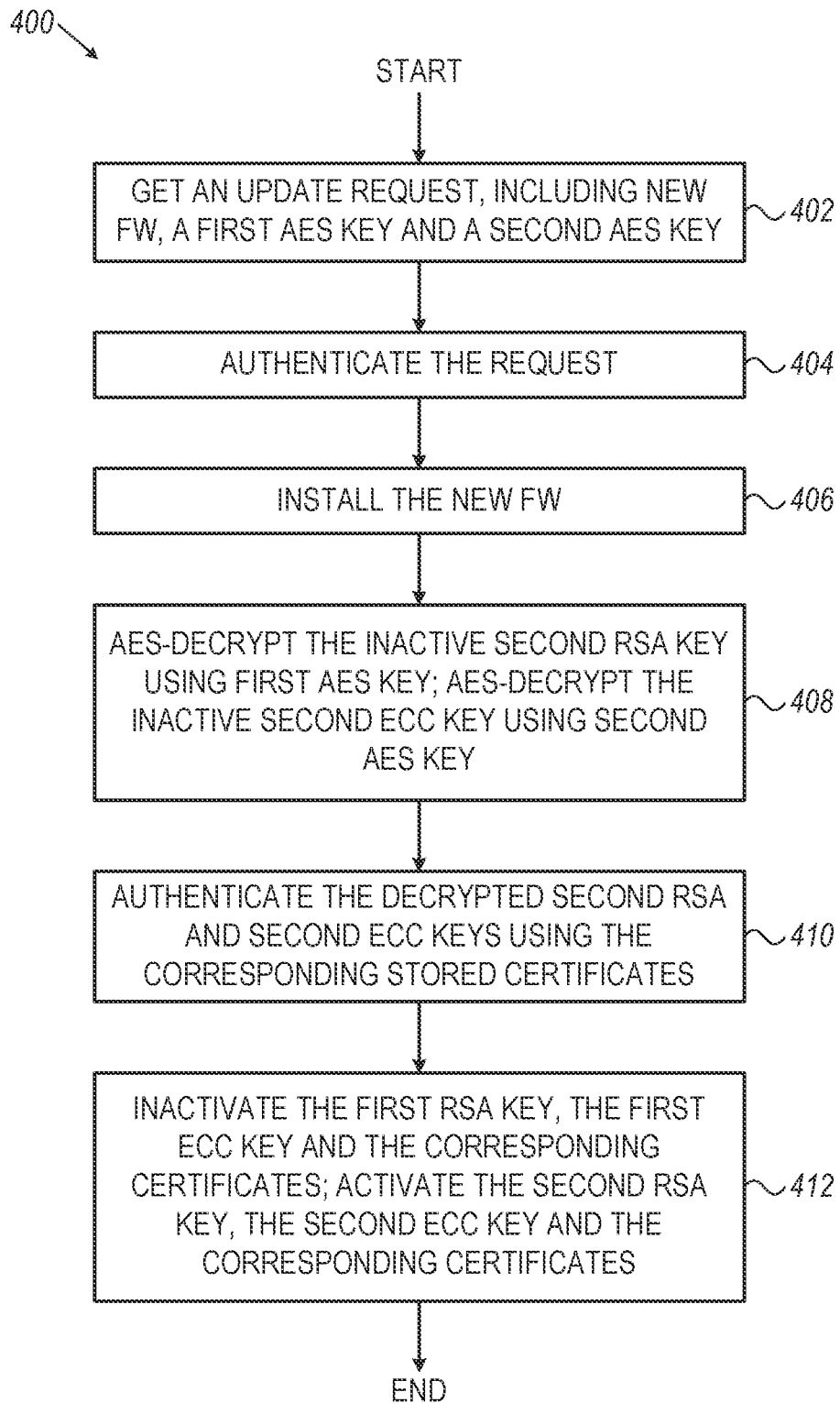
FIG. 4 is a flow chart that schematically illustrates a method for secure key update, in accordance with embodiments of the present invention.

FIG. 4 is a flowchart 400 that schematically illustrates a method for secure key update in a TPM, in accordance with an embodiment of the present invention. The method is executed by processor 110 that is embedded in the TPM. The TPM comprises (see FIG. 2 above): A FW, active RSA and ECC keys with the corresponding certificates, inactive and AES-encrypted RSA and ECC keys with the corresponding certificates.

The flowchart begins at a Get Update Request operation 402, wherein processor 110 receives, from a host CPU, a request to update the FW and the keys (the request is typically initiated by the TPM vendor). The request includes a new FW and decryption keys for the inactive RSA and ECC keys (in some embodiments, only one inactive key may be used; on an embodiment, one or keys may not be encrypted).

Next, at an Authenticate Update Request operation 404, processor 110 authenticates, using the currently active set of keys.

Processor 110 then, in an Install-TPM operation 406, installs the new FW (the flowchart, from this point on, may be executed by the new FW or, in embodiments, by the old FW).

Next, at a Decrypt-Keys operation 408, processor 110 AES-decrypts the inactive RSA and ECC keys using the provided decryption keys. After the keys are decrypted, processor 110, in an Authenticate-Keys operation 410, authenticates the keys using the inactive certificates.

Lastly, at an Inactivate-old-Activate-New operation 412, processor 110 inactivates the previous set of RSA and ECC keys and certificates and activates the new set. In some embodiments, inactivating comprises scrapping a previous code (e.g., programming with all-1); in other embodiments inactivating and activating comprises setting suitable indicators in the FW.

The flowchart illustrated in FIG. 4 and described hereinabove is an example that is cited merely for the sake of conceptual clarity. Other configurations may be used in alternative embodiments. For example, in some embodiments, the order of operations may be different. In embodiments, inactive keys may be erased rather than overwritten. In an embodiment, parts or the complete non-volatile TPM contents are copied to a RAM and, after decrypting an authenticating the inactive keys, the non-volatile part of the TPM is erased, and then programmed with the new FW and with the keys.

In summary, the methods and apparatuses described herein with reference to FIG. 1 through 4 facilitate secure replacement of TPM keys by pre-provisioning additional inactive keys, usually encrypted. In case a security breach is detected, the TPM vendor can send a new FW with decryption keys for the inactive keys; the TPM can then decrypt the inactive keys and use them in lieu of the compromised previous set of keys.

The different elements of TPMs 100 and 200 may be implemented using suitable hardware, such as in one or more Application-Specific Integrated Circuits (ASICs) or Field-Programmable Gate Arrays (FPGAs), using software, using hardware, or using a combination of hardware and software elements. The inactive and active keys, and the keys certificates may be stored in non-volatile memory such as Flash, Electrically-Alterable Programmable Read Only Memory (EAPROM), Electrically-Erasable Programmable Read Only Memory (EEPROM) or any other suitable Non-Volatile-Memory technology.

Although the embodiments described herein refer mainly to secure TPM key update, the disclosed techniques may be applicable to other applications, such as any security devices that are provisioned with one or more unique keys (sometimes called Device ID).

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A security device, comprising:
a memory, configured to store security firmware (FW), an active cryptographic key and an encrypted inactive cryptographic key, pre-provisioned in the memory during production of the security device, wherein the active cryptographic key is associated with an active authentication certificate for authenticating the active cryptographic key, and the inactive cryptographic key is associated with an inactive authentication certificate for authenticating the inactive cryptographic key; and
a processor, configured to carry out security tasks by executing the security FW, and, provided a security-update indication is received from a vendor of the security device, with a request to update the active cryptographic key, to (i) inactivate the active cryptographic key and the active authentication certificate, (ii) receive a decryption key from the vendor, (iii) decrypt the inactive cryptographic key, with the key received from the vendor and (iv) activate the inactive cryptographic key and the inactive authentication certificate.

2. The security device according to claim 1, wherein the processor is further configured to authenticate the decrypted inactive cryptographic key.

3. The security device according to claim 1, wherein the inactive cryptographic key is encrypted using Advanced Encryption Standard (AES) encryption.

4. The security device according to claim 1, wherein the inactive cryptographic key comprises a Rivest-Shamir-Adleman (RSA) key.

5. The security device according to claim 1, wherein the inactive cryptographic key comprises an Elliptic-Curve-Cryptography (ECC) key.

6. The security device according to claim 1, wherein the security device is configured not to allow altering the active cryptographic key.

7. The security device according to claim 1, wherein the processor is configured to activate the inactive cryptographic key as part of a complete update of the FW and the active cryptographic key.

8. The security device according to claim 1, wherein the processor erases or overwrites the active cryptographic key, responsively to the security-update indication.

9. A method for firmware updating in a secure device, the method comprising:
storing in the secure device security firmware (FW), during production, an active cryptographic key and an encrypted inactive cryptographic key, wherein the active cryptographic key is associated with an active authentication certificate for authenticating the active cryptographic key, and the inactive cryptographic key is associated with an inactive authentication certificate for authenticating the inactive cryptographic key;
carrying out security tasks by executing the security FW; and
provided a security-update indication is received, from a vendor of the security device, with a request to update the active cryptographic key, inactivating the active cryptographic key and the active authentication certificate, receiving a decryption key from the vendor, decrypting the inactive cryptographic key with the key received from the vendor, and activating the inactive cryptographic key and the inactive authentication certificate.

10. The method according to claim 7, further comprising authenticating the decrypted inactive cryptographic key.

11. The method according to claim 7, wherein the inactive cryptographic key is encrypted using Advanced Encryption Standard (AES) encryption.

12. The method according to claim 9, wherein the inactive cryptographic key comprises a Rivest-Shamir-Adleman (RSA) key.

13. The method according to claim 9, wherein the inactive cryptographic key comprises an Elliptic-Curve-Cryptography (ECC) key.

14. The method according to claim 9, wherein the secure device is configured not to allow altering the active cryptographic key.

15. The method according to claim 9, comprising updating the FW with the activation of the inactive cryptographic key.

16. The method according to claim 9, further comprising erasing or overwriting the active cryptographic key, responsively to the security-update indication.

* * * * *